INVENTOR.
Keisuke IZAWA
Katsuhisa FURUTA
BY
Wenderoth, Lind and Ponack
attorneys 3,535,084
AUTOMATIC AND CONTINUOUS ANALYSIS OF
MULTIPLE COMPONENTS
Keisuke Izawa, Kawasaki-shi, and Katsuhisa Furuta,
Tokyo-to, Japan; and Fumiko Izawa, legal heir of said
Keisuke Isawa, deceased
Filed May 16, 1966, Ser. No. 550,537
Claims priority, application Japan, May 29, 1965,
40/31,555
Int. Cl. G01n 31/08, 33/00
U.S. Cl. 23—232                 5 Claims

ABSTRACT OF THE DISCLOSURE

A method and apparatus for continuous measurement of the presence and amount of the individual elements in a plurality of elements, such as a mixture of gases. A flow of the elements is continuously introduced into an analysis the quantity of the flow being in the form of at least one pseudo-random binary signal having a pulse form, periodic auto-correlation function. The flow of elements is passed through the analysis apparatus to obtain an output flow having therein flows of separate elements in the mixture the quantities of which are in the form of periodic signals, the signals superposed to form a composite periodic signal. The output flow is analyzed to obtain a composite signal representative of the quantities of the separate elements present in the output flow, and the input signal and output signal are compared to obtain the cross-correlation function between the input and the output. The cross-correlation function can be represented as a periodic signal having spaced peaks each representative of the presence and the amount of one of the individual elements so that continuous and simultaneous analysis of multiple kinds of samples and elements is possible.

---

This invention relates to automatic and continuous measurements for analysis of multiple kinds of samples and elements and more particularly to new method and apparatus, for example, for gas chromatography, for attaining automatic measurement of multiple kinds of samples and elements.

Heretofore, most of the known analysis apparatuses have been incapable of carrying out continuous analysis of multiple kinds of samples and elements, as described more fully hereinafter.

An object of the present invention is to provide a method and apparatus for affording automatic, continuous, and simultaneous analysis of multiple kinds of samples and elements.

A particular object of the present invention is, speaking concretely, to provide a new gas chromatograph which carries out easy analysis of multiple kinds of gas components.

According to the present invention, briefly stated, there are provided a method and apparatus for continuous measurement of multiple elements, characterized in that one or more inputs are continuously introduced in the form of a pseudo-random binary signal having a pulse form, periodic, auto-correlation function, and response is detected as a cross-correlation function between the input or its function and the output thereby to make possible continuous and simultaneous analysis of multiple kinds of samples or elements.

The nature, principle, and details of the invention will be more clearly apparent from the following detailed description when read in conjunction with the accompanying drawings, in which.

Figure 2:
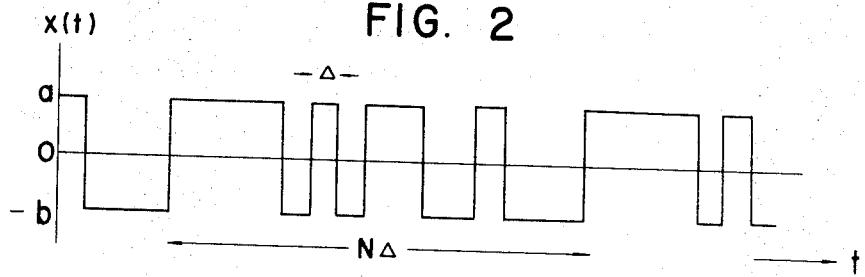
FIG. 2 is a graphical representation of a pseudo-random binary signal ($N=15$) for use in place of a conventional discontinuous input.
Figure 4A:
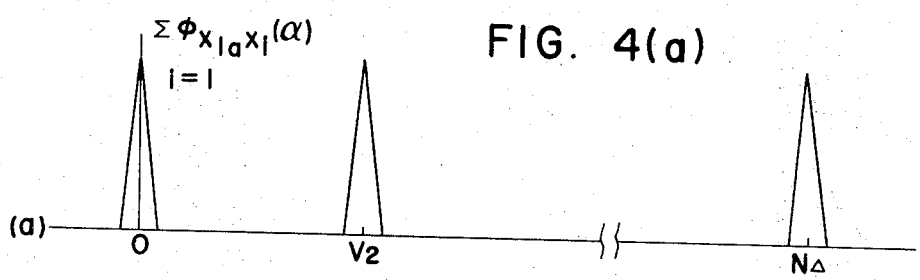
Figure 4B:
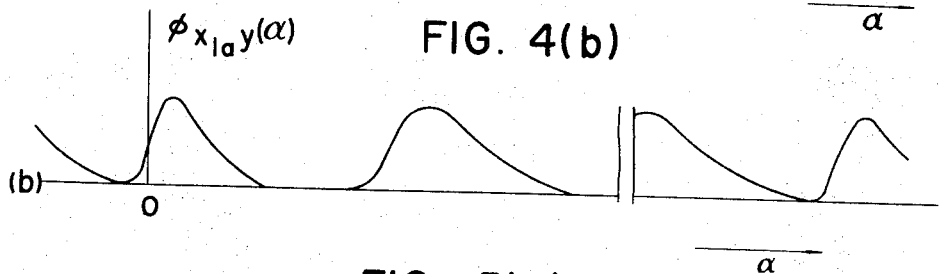

FIGS. 3($a$) and 3($b$) are graphical representations of an example of an auto-correlation function of the signal shown in FIG. 2 and a cross-correlation function of the auto-correlation function and a signal $x_a(t)$ determined from a discontinuous quantity $x(t)$;

FIGS. 4($a$) and 4($b$) are graphical representations of an example of a cross-correlation function of each input signal $x_i(t)$ and $x_{1a}(t)$ and a cross-correlation function of output $y(t)$ and $x_{1a}(t)$ in the case where a large number of analyses are carried out simultaneously;

FIG. 5($a$) is a schematic block diagram of an apparatus for application of the invention to gas chromatography.

Figure 5A:
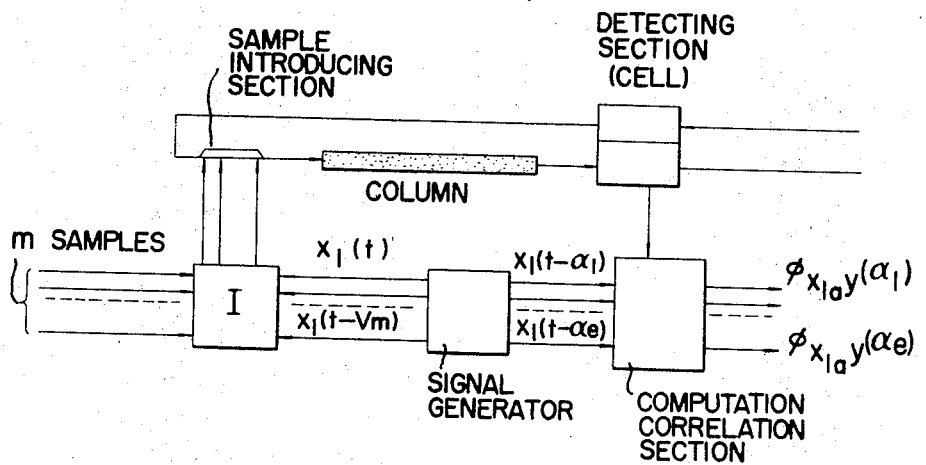
Figure 5B:
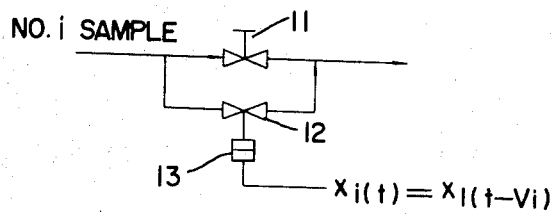
Figure 6:
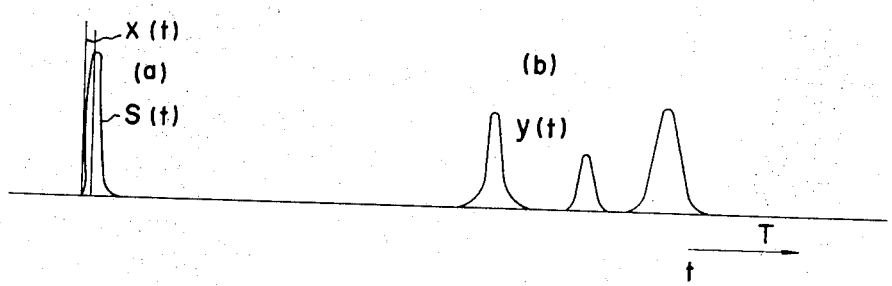
Figure 7:
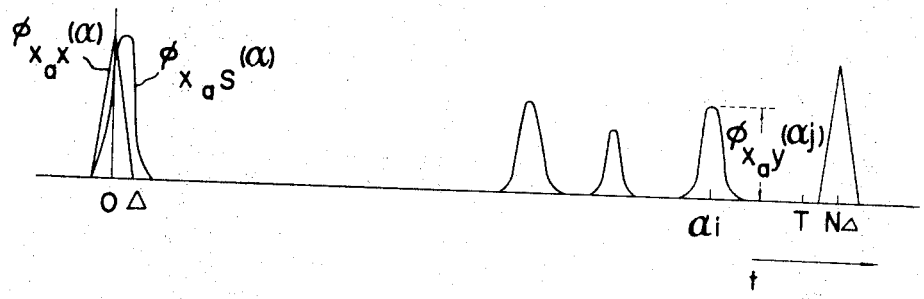

FIG. 5($b$) is a fragmentary flow diagram showing the details of the part designated by the reference character I in the apparatus shown in FIG. 5($a$); and FIGS. 6 and 7 are graphical representations indicating analysis results obtained, respectively, by a conventional method and the method of the invention in the case of gas chromatography of a single sample containing three constituents.

Figure 1:
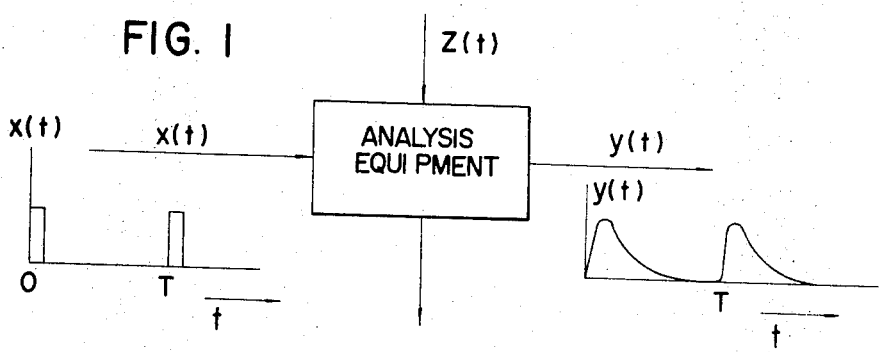
FIG. 1 is an explanatory diagram showing one example of an ordinary analytical operation known heretofore.

As mentioned hereinbefore, most of the analysis apparatuses known heretofore have been incapable of carrying out an analysis operation continuously. In one example of known practice as illustrated in FIG. 1, a flow in the form of a signal $x(t)$ is applied in pulse form with pulses at a specific interval T is supplied to the analysis equipment, during which interval, $z(t)$ is maintained constant. The analysis result is obtained in the interval T as indicated by $y(t)$ in FIG. 1.

In the case where $x(t)$ represents a sample or the like, $z(t)$ represents a reagent or carrier or the like, and in the case where a reagent or carrier or the like is taken as $x(t)$, $z(t)$ may be considered to be a sample. In this case, the analysis result $y(t)$ can be obtained only in a discontinuous manner.

The present invention has succeeded in attaining automatic and continuous measurement in a gas chromatograph and the like by utilizing the fact that since, for example, the gas chromatograph relates to a device to measure output corresponding to a pulsed input of specimens, when the auto-correction function of the input is a pulse signal, the cross correlation function of said input and output is made to correspond to the pulse response of the analysis system according to correlation method.

The manner in which the present invention affords continuous analysis operation will be apparent from the following description with respect to a preferred embodiment of the invention as illustrated in FIGS. 2 through 5 and FIG. 7.

According to the present invention, a continuous quantity (for example, the pseudo-random binary signal shown in FIG. 2) is taken as $x(t)$, and $y(t)$ is detected also as a continuous response corresponding thereto. However, since $x(t)$ in this case does not have a pulse form as indicated in FIG. 1, $y(t)$, itself, does not become an analysis result. Then, if the auto-correlation function $\phi_{xx}(\alpha)$ of $x(t)$ or the cross-correlation function $\phi_{x_ax}(\alpha)$ of $x_a(t)$ and $x(t)$ determined from $x(t)$ assumes a pulse form as indicated in FIG. 3, and if the pulse interval $N\Delta$ (in the case of FIG. 3($a$)) or min ($N-M, M$) $\Delta$ (in the case of FIG. 3($b$)) of this correlation function is caused to be greater than the conventional sampling interval T, the cross-correlation function $\phi_{xy}(\alpha)$ between the input and output or the cross-correlation function $\phi_{x_ay}(\alpha)$ of $x_a(t)$ and $y(t)$ will become the analysis result with respect to $\phi_{xx}(\alpha)$ or $\phi_{x_ay}(\alpha)$. (The folowing analytical consideration relates to only $\phi_{x_ax}(\alpha)$ and $\phi_{x_ay}(\alpha)$.)

The case when a linear relationship such as, for example, that represented by the following Equation (1) is valid between $x(t)$ and $y(t)$ will be considered.

$$y(t) = \int_0^\infty g(\tau)x(t-\tau)d\tau \qquad (1)$$

where $y(t)$ is the output signal and $x(t)$ is the input signal to the column of the analysis system, and $g(\tau)$ is the weighting function of said column for a given gas stream.

From the Equation (1), the following equation can be obtained by calculating the auto-correlation function of $x_a(t)$ and $y(t)$, and rewriting the Equation (1) by using said function.

$$\phi_{x_ay}(\alpha) = \int_0^\infty g(\tau)\phi_{x_ax}(\alpha-\tau)dt \qquad (2)$$

where $$\begin{cases} \phi_{x_ax}(\alpha) = \frac{1}{N\Delta}\int_0^{N\Delta} x_a(t)x(t+\alpha)dt \\ \phi_{x_ay}(\alpha) = \frac{1}{N\Delta}\int_0^{N\Delta} x_a(t)y(t+\alpha)dt \end{cases}$$

Where the function is taken over a time interval $t-N\Delta$ to $t$, the cross-correlation function can be expressed as follows:

$$\phi_{xy}(\alpha) = \frac{1}{N\Delta}\int_{t-N\Delta}^t x(1-\alpha)y(1)dl \qquad (2a)$$

wherein 1 is the time variable between time $t-N\Delta$ and $t$.

Since Equations (1) and (2) and (2a) are of the same form, it is possible to apply continuously a random signal having a period greater than T indicated in FIG. 2, for example, and to obtain continuously an analysis result from the cross-correlation function $\phi_{x_ay}(\alpha)$ of $x_a(t)$ and $y(t)$.

While the above consideration concerns the case where $x(t)$ is of a certain single kind, in many cases $x(t)$ consists of several kinds such as $x_1(t)$, $x_2(t)$, ... $x_i(t)$, ... $x_m(t)$. In this case, the following relationships are satisfied, and $x_i(t)$ is applied simultaneously.

$$x_i(t) = x_1(t-V_i) \ (V_1=0) \ i=1, 2, \ldots m \qquad (3)$$

where $x_1(t)$ is one pseudo-random signal of the type shown in FIG. 2 and is a signal having an auto-correlation function or a cross-correlation function with $x_{1a}(t)$ determined for $x_1(t)$ so as to produce a signal of the type as shown in FIG. 3.

For example, if the analysis time required in the case where a pulse is applied as $x_i(t)$, as practiced heretofore, is denoted by $Ti$, $Vi$ will satisfy the following condition.

$$Vi \geq \sum_{j=1}^{i=1} Tji = 1, \ldots, m (T0=0)$$

Figure 3A:
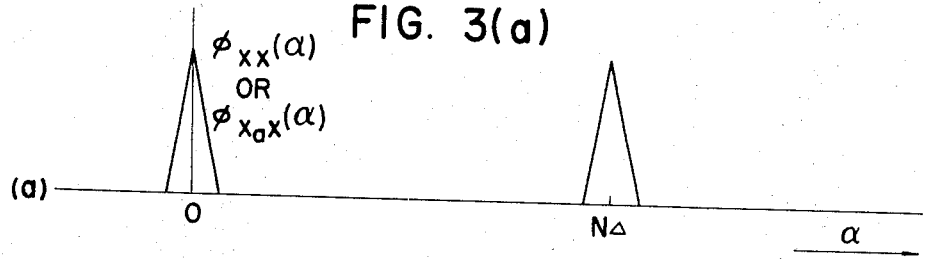
Figure 3B:
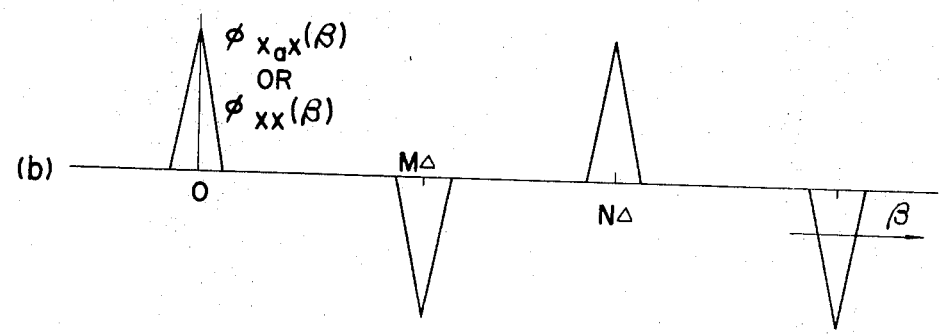

$V_m + T_m \leq N\Delta$ (the case of FIG. 3(a)) or min $(N-M, M) \Delta$ (the case of FIG. 3(b))

For this reason, the analysis result obtained by the application of $x_j(t)$ will be given by $\phi_{x_{1a}y}(\alpha+Vi)$ where $0 \leq \alpha \leq Ti$. Examples respectively of $\phi_{x_{1a}xi}(\alpha)$ and $\phi_{x_{1a}y}(\alpha)$ in these cases are indicated in FIG. 4. The output in the case where there are a number of inputs $x_i(t)$ as described above can be expressed by the following equation.

$$y(t) = \int_0^\infty \sum_{i=1}^m gi(\tau)x_i(t-\tau)d\tau \qquad (4)$$

From Equation 4, the following equation can be obtained.

$$\phi_{x_{1a}y}(\alpha) = \int_0^\infty \sum_{i=1}^m gi(\tau)\phi_{x_{1a}x_i}(\alpha-\tau)dt \qquad (5)$$

where $gi(\tau)$ expreses the analyzed results of the $i$'th input sample to the unit pulsed form input. Then, $$\sum_{i=1_j}^m \phi_{x_{1a}x_i}(a)$$

is equal to a value to which a pulse has been applied after the elapse of a specific interval as indicated in FIG. 4(a). Therefore, as long as the above condition is satisfied, the analysis result is given by $\phi_{xy}(\alpha)$.

As demonstrated above, in the case also when $x(t)$ consists of a plurality of elements, a large number of analyses can be carried out simultaneously and continuously.

The present invention will now be described with respect to an example of its application to gas chromatography. In the case of conventional gas chromatography, the signal $x(t)$ of FIG. 1 is representative of the control operation of the metering valve controlling the flow of a sample to be analyzed, and $z(t)$ represents a quantity such as the carrier gas and the packed substances within the column and is considered to be constant. The analysis equipment includes a detector and a recorder. The present invention can be applied to this case by means of an apparatus as shown in FIG. 5.

As shown in FIG. 5(a), the apparatus comprises a conventional column for separating the components of a mixture of gases, which column has a sample introducing section on the upstream end thereof through which the samples are introduced into a carrier gas which is streaming through the column. A valving means I is connected to the sample introducing section for feeding one or more samples at a time to the sample introducing section. Connected to the valving means I is a signal generator for feeding signals of the desired form to the valving means for imposing the signals on the flow of samples. Several forms of signal generators are available which will produce such a signal or signals. A detecting section is connected to the output of the column for detecting the components of the output of the column, and the detecting section generates a signal which is representative of the various components of the gas separated from each other by the column. The detecting section is connected to a computation correlation section, which also has the signal generator connected thereto, and the computation correlation section obtains the cross-correlation function between the input signal as represented by the signals from the signal generator and the output signal as detected by the detecting section. The cross correlation function can then be fed to a display means for displaying the cross-correlation function in visual form.

The valving means 1 is shown in FIG. 5(b) and includes a main manually settable valve 11 and and a bypass valve 12 which has an opening and closing means 13 coupled thereto which is driven by the signal or signals from the signal generator. The manually settable valve is used to adjust the gas flow to obtain a proper form of output signal which can be used to obtain a cross-correlation function of the form shown in FIG. 4(a).

When $x(t)$ enters the column with a pulse as indicated in at (a) in FIG. 6, which can be derived from the signal generator, or if desired can be detected by a detector (not shown) ahead of the column, $y(t)$ emerges in the form of a number of peaks as indicated at (b) in FIG. 6 with respect to the detected input $S(t)$ to the column. However, when $x_i(t)$ is according to Equation 3, and the sample is introduced into the carrier gas, $\phi_{x_{1a}y}(\alpha)$ indicates the analysis result in the case when the sample is introduced, by means of the valve operation with a waveform $$\sum_{i=1}^{m} \phi x_{1a} x_i(\alpha)$$

that is, of $\phi_{x_{1a}}S(\alpha)$ in accordance with the foregoing consideration.

An example of the case of $i=1$ is indicated in FIG. 7. In this particular case, when the by-pass quantity of FIG. 5(b) is suitably selected, Equation 1 provides a close approximation with respect to any packed substance and any gas. Moreover, even when there is noise in the output $y(t)$, its effect can be diminished.

Thus, the present invention affords, in gas chromatography, simultaneous and continuous analysis in cases of a large number of samples containing multiple elements to be simultaneously analyzed.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. A method for continuous measurement of the presence and amount of the individual components in a plurality of samples, which method comprises continuously introducing into an analysis apparatus a flow of the samples the quantity of which is in the form of at least one pseudo-random binary signal having a pulse form, periodic auto-correlation function, passing said flow of samples through the analysis apparatus to obtain an output flow having therein flows of separate components in the mixture the quantities of which are in the form of periodic signals, the signals being superposed to form a composite periodic signal, analyzing the output flow to obtain a composite signal representative of the quantities of the separate components present in the output flow, and comparing the input signal and output signal to obtain the cross-correlation function between the input and the output, whereby the cross-correlation function can be represented as a periodic signal having spaced peaks each representative of the presence and the amount of one of the individual components so that continuous and simultaneous analysis of multiple kinds of samples and components is possible.

2. A method for continuous measurement of the presence and amount of the individual components in a plurality of samples, which method comprises continuously introducing into an analysis apparatus a flow of the samples the quantity of which is in the form of at least one pseudo-random binary signal $x(t)$ having a periodic pulse form with a period $N\Delta$, periodic auto-correlation function $$\phi_{xx}(\alpha) = \frac{1}{N\Delta} \int_{t-N\Delta}^{t} x(1)x(1-\alpha)dl$$

wherein 1 is the time variable between $t-N\Delta$ and time $t$, passing said flow of samples through the analysis apparatus to obtain an output flow having therein flows of separate components in the mixture the quantities of which are in the form of periodic signals, the signals being superposed to form a composite periodic signal, analyzing the output flow to obtain a composite signal $y(t)$ representative of the quantities of the separate components present in the output flow, and comparing the input signal and output signal to obtain for the input and output the cross-correlation function $$\phi_{xy}(\alpha) = \frac{t}{N\Delta} \int_{t-N\Delta}^{t} x(1-\alpha)y(1)dl$$

whereby said cross-correlation function can be represented as a periodic signal having spaced peaks each representative of the presence and the amount of one of the individual components so that continuous and simultaneous analysis of multiple kinds of samples and components is possible.

3. A method as claimed in claim 2 wherein the step of introducing the flow of samples into the analysis apparatus comprises introducing a flow of a carrier gas into a gas analysis apparatus while introducing into the carrier gas a pulsed flow of a mixture of gases to be analyzed, and the step of analyzing the output flow comprises sensing the presence and amount of the individual gases in the output flow from the gas analysis apparatus.

4. An apparatus for the continuous measurement of the presence and amount of the individual components in a plurality of samples, which apparatus comprises an analysis apparatus for producing from an input of a flow of a mixture of materials an output flow having therein flows of separate components in the mixture, feed means coupled to the input end of the analysis apparatus for continuously introducing into the analysis apparatus a flow of samples the quantity of which is in the form of at least one pseudo-random binary signal having a pulse form, periodic auto-correlation function, detecting means coupled to the output end of the analysis apparatus for analyzing the output flow from the analysis apparatus for obtaining a composite signal representative of the quantities of the separate components present in the output flow, and computation means coupled to said feed means and to said detecting means for obtaining the cross-correlation function between the input and output from said analysis apparatus.

5. An apparatus as claimed in claim 4 in which said analysis apparatus is a gas analysis apparatus, and said feed means includes means for pulsing the flow of gas to be analyzed as it is fed to said apparatus.

References Cited

UNITED STATES PATENTS

| | | | |
|---|---|---|---|
| 3,027,241 | 3/1962 | Andreatch et al. | |
| 3,169,832 | 2/1965 | Gallaway et al. | |
| 3,327,519 | 6/1967 | Crawford. | |
| 3,236,092 | 2/1966 | Carter | 73—23.1 |

OTHER REFERENCES

Savas, "Principles of Computer Control," pp. 114–117, 1965.

MORRIS O. WOLK, Primary Examiner

R. E. SERWIN, Assistant Examiner

U.S. Cl. X.R.

23—230, 253, 254, 255; 73—23.1